US009747009B2

(12) United States Patent
Jadhav et al.

(10) Patent No.: US 9,747,009 B2
(45) Date of Patent: Aug. 29, 2017

(54) USER INTERFACE FOR CREATING A PLAYLIST

(76) Inventors: Shubhangi Mahadeo Jadhav, Nijmegen (NL); Rahul Kashinathrao Dahule, Nijmegen (NL)

(*) Notice: Subject to any disclaimer, the term of this patent is extended or adjusted under 35 U.S.C. 154(b) by 561 days.

(21) Appl. No.: 14/130,733

(22) PCT Filed: Jul. 4, 2012

(86) PCT No.: PCT/EP2012/063029
§ 371 (c)(1),
(2), (4) Date: Jan. 3, 2014

(87) PCT Pub. No.: WO2013/004741
PCT Pub. Date: Jan. 10, 2013

(65) Prior Publication Data
US 2014/0164998 A1 Jun. 12, 2014

(30) Foreign Application Priority Data
Jul. 4, 2011 (EP) .................. PCT/EP2011/061252

(51) Int. Cl.
*G06F 3/00* (2006.01)
*G06F 9/00* (2006.01)
(Continued)

(52) U.S. Cl.
CPC ...... *G06F 3/04842* (2013.01); *G06F 3/04847* (2013.01); *G06F 17/30749* (2013.01);
(Continued)

(58) Field of Classification Search
CPC ........ G06F 3/0484; G06F 9/4443; G06F 8/34; G06F 3/0486; G06F 8/38; G06F 3/0481;
(Continued)

(56) References Cited

U.S. PATENT DOCUMENTS

| 2004/0237759 | A1* | 12/2004 | Bill | G06F 17/30017 84/668 |
| 2005/0078182 | A1* | 4/2005 | Lipsky | G06F 3/0481 348/143 |
| 2006/0159427 | A1* | 7/2006 | Kanegae | G11B 27/034 386/244 |
| 2010/0318928 | A1* | 12/2010 | Neuman | G06F 3/0482 715/769 |

FOREIGN PATENT DOCUMENTS

WO 2005113099 A2 12/2005

OTHER PUBLICATIONS

Van Gulik R et al., "Visual Playlist Generation on the Artist Map", Proceedings of the 6th international conference on music information retrieval, ISMIR 2005, Sep. 11, 2005, pp. 520-523, XP002613950.

(Continued)

*Primary Examiner* — Kieu Vu
*Assistant Examiner* — Anita D Chaudhuri
(74) *Attorney, Agent, or Firm* — David A. Guerra

(57) ABSTRACT

A user-friendly graphical user interface is proposed to enable creation of a playlist of data elements of any type. A graphical object is displayed representing a content based logical map arranged in two or three dimensions and defining characteristics at predefined coordinates. A trajectory defined by a mathematical spline function and having a start point, an end point and one or more intermediate points is drawn and can be changed by moving the steering point of at least one of the start point and the end point. The data elements for the playlist are selected by searching in metadata for characteristics that best match the characteristics of points along the trajectory.

23 Claims, 9 Drawing Sheets

(51) Int. Cl.
*G06F 17/00* (2006.01)
*G06F 3/0484* (2013.01)
*G06F 17/30* (2006.01)
*G11B 27/034* (2006.01)
*G11B 27/10* (2006.01)
*G11B 27/34* (2006.01)
*H04N 21/262* (2011.01)
*H04N 21/475* (2011.01)
*H04N 21/81* (2011.01)

(52) U.S. Cl.
CPC ...... *G06F 17/30772* (2013.01); *G11B 27/034* (2013.01); *G11B 27/105* (2013.01); *G11B 27/34* (2013.01); *H04N 21/26258* (2013.01); *H04N 21/4755* (2013.01); *H04N 21/8113* (2013.01)

(58) Field of Classification Search
CPC . G06F 3/0482; G06F 3/04847; G06Q 10/107; G06Q 10/10; H04N 1/00389; H04N 1/00411
See application file for complete search history.

(56) References Cited

OTHER PUBLICATIONS

Neumayer et al.., "PlaySOM and PocketSOMPlayer, Alternative Interfaces to Large Music Collections", Proceeds Annual International Symposium on Music Information Retrieval, Sep. 11, 2005, pp. 618-623, XP002360090
Casey M. A. et al., "Content-Based Music Information Retrieval: Current Directions and Future Challenges", Proceedings of the IEEE, IEEE. New York US, vol. 96, No. 4, Apr. 1, 2008, pp. 668-696, XP011206028, ISSN: 0018-9219.
Van Gulik R. et al., "Mapping Music in the Palm of Your Hand, Explore and Discover Your Collection", Proceedings of th e5th International Conference on Music Information Retrieval, ISMIR 2004, Oct. 10, 2004, XP002613951.
James D. Foley, "Computer Graphics" Principles and Practice 2nd Edition, 1996, Addison-Wesley, USA, XP002687617, ISBN: 0-201-84840-6, pp. 471-529.

* cited by examiner

USER INTERFACE FOR CREATING A PLAYLIST

CROSS-REFERENCE TO RELATED APPLICATIONS

This application is an U.S. national phase application under 35 U.S.C. §371 based upon co-pending International Application No. PCT/EP2012/063029 filed on Jul. 4, 2012. Additionally, this U.S. national phase application claims the benefit of priority of co-pending International Application No. PCT/EP2012/063029 filed on Jul. 4, 2012 and EP Application No. PCT/EP2011/061252 filed on Jul. 4, 2011. The entire disclosures of the prior applications are incorporated herein by reference. The international application was published on Jan. 10, 2013 under Publication No. WO 2013/004741 A1.

FIELD OF THE INVENTION

The present invention relates to the creation of playlists comprising data elements of any kind. More specifically, the invention relates to creating playlists using a graphical user interface.

BACKGROUND

Driven by the rapid expansion of the Internet, a variety of data is becoming available more and more. Examples of such data are media content, e.g. digital video, digital audio and digital photos, devotional content, educational content, sports content, gaming content, e-reading content and fashion related content. From the enormous amount of data it is becoming difficult to find favorite data. E.g. with respect to digital audio, it is to be expected that at some point in time substantially all music will be available online, e.g. through music portal websites. With potentially billions of music tracks from new and existing artists being added to the worldwide online available music collection on a monthly time scale, it is becoming very difficult to find favorite music tracks or new music tracks to ones liking from the vast collection of music. Analogous growth in available content is seen for other types of data.

Single items of data, such as e.g. a music track, a video, a photo, a news item or informative item, a game, an e-book or an e-cartoon are examples of data elements. To enable searching for and/or selection of particular data element, data elements are typically provided with characterizing information in the form of meta-data. E.g. for music tracks the meta-data typically includes characteristics like artist, title, producer, genre, style, composer, year of release and/or any other characterizing information. Analogously, other types of data can be enriched with meta-data.

A playlist is a collection of data elements grouped together under a particular logic. The playlist can be created such to e.g. reflect a particular mood, accompany a particular activity (e.g. work, romance, sports), serve as background music, or to explore novel songs for music discoveries.

Playlist may be generated either automatically or manually. Known online music portals, such as Spotify (www.spotify.com) offer tools to make, share, and listen to playlists in the form of sequences of music tracks selected manually. Individual tracks in the playlist are selectable from an online library of music. Automatically created playlists typically contain data elements with matching or similar meta-data. Manually selection of a data element is typically driven by watching or listening to a particular data element, a recommendation of a data element or a preset playlist. It is possible that a user provides a manually selected data element, e.g. a music track, or particular meta-data, e.g. a music artist, as a query and that a playlist is generated automatically in response to this query. Such a service is often offered by online music radios such as Pandora (www.pandora.com), and Last.fm (www.last.fm).

A graphical user interface can support a user to select data elements to be included in a playlist. The graphical user interface is typically part of a web page, an online application, a software application for use on e.g. a PC, notebook, smart phone or tablet PC, or an application plug-in. Known graphical user interfaces for creating playlists are found to be either difficult to use, difficult to learn or requiring a lot of user interaction.

A visual playlist creation method is known from VAN GULIK R ET AL: "Visual Playlist Generation on the Artists Map", PROCEEDINGS OF THE 6TH INTERNATIONAL CONFERENCE ON MUSIC INFORMATION RETRIEVAL, ISMIR 2005, 11 Sep. 2005, pages 520-523, XP002613950, London. The method involves the drawing of a path using a mouse and/or clicking individual points of interest on the map and interconnecting these points to form the path. The drawn path is used as a basis for creating a playlist. A disadvantage of this method is that the user will have to spend lot of time to produce the desired shape of the path requiring lot of attempts to produce the playlist path. For example, using a mouse movement method (recording of the mouse movements within the visualization area while the left button is pressed) a user is able to decide on the starting point and the end point of the playlist path, but the playlist path drawn connecting the desired start point and the end point may not have the desired intermediate points. Thus the user will have to redraw the playlist path again to get the desired path of the intermediate points whilst remembering the start point and the end point of the previously attempted playlist path. The other method of clicking individual points of interest on the map is also not very user friendly since this method requires lot of time and effort to affix the points and then further connecting these points in a series of steps.

Moreover, the method disclosed by VAN GULIK R ET AL will be difficult to use when the desired playlist path is complex to draw when there are singular or multiple points of desired intersection(s) of the start/end/intermediate point(s) with the start/end/intermediate point(s) defining the playlist path, or when the desired play listing points (start point, end point, intermediate point(s)) are falling on the exact/near-exact/near to the outer boundary of the visual map. Every new attempt to produce the desired playlist path requires the user to erase the playlist path and redraw the playlist path. The user will have to repeat the steps until the user is able to produce a desired playlist path.

There is a need for a play listing method using a graphical user interface that addresses the above mentioned difficulties and offers a logical method which is easy to use and reproduces the desired playlist path. The playlisting path can be used for creating a playlist for different types of data from a vast and growing amount of available data elements.

SUMMARY OF THE INVENTION

According to an aspect of the invention a computer-implemented method is proposed for creating a playlist. The playlist comprises a plurality of data elements. Each data element is associated with meta-data representing one or more characteristics of the data element. The method comprises displaying a graphical object wherein points representing predefined characteristics are located at predefined coordinates in a Cartesian coordinate system. Each predefined characteristic is unique. The predefined characteristics form a set of characteristics. The one or more characteristics of each data element is a subset of the set of characteristics. The method further comprises displaying a graphical representation of an initial trajectory in the graphical object. The initial trajectory is formed by a mathematical spline function connecting a first point at first coordinates in the graphical object and representing a first characteristic, a second point at second coordinates in the graphical object and representing a second characteristic, and a predefined number of intermediate points between the first point and the second point, wherein each intermediate point represents to an intermediate characteristic. The first point and the second point are control points in the mathematical spline function. The method further comprises displaying a first steering point in or near the graphical object. The first steering point is a first control point in the mathematical spline function. The method further comprises displaying a second steering point in or near the graphical object. The second steering point is a second control point in the mathematical spline function. The method further comprises receiving a first user input selecting one of the first point and the second point as a starting point and defining the other one of the first point and the second point as an end point. The method further comprises receiving a second user input moving at least one of the first steering point and the second steering point and using the mathematical spline function to calculate an updated trajectory and to recalculate the coordinates of the intermediate points such that the intermediate points are located substantially on the updated trajectory. The method further comprises selecting the data elements by searching for data elements with meta-data that best match the first characteristic represented by the first point on the updated trajectory, the one or more intermediate characteristics represented by the one or more intermediate points on the updated trajectory and the second characteristic represented by the second point on the updated trajectory. The method further comprises creating the playlist. In the playlist the data elements are ordered a first data element corresponding to the starting point to a last data element corresponding to a end point.

According to another aspect of the invention a graphical user interface is proposed for creating a playlist. The playlist comprises a plurality of data elements wherein each data element is associated with meta-data representing one or more characteristics of the data element. The graphical user interface comprises a graphical object wherein points representing predefined characteristics are located at predefined coordinates in a Cartesian coordinate system. Each predefined characteristic is unique. The predefined characteristics form a set of characteristics. The one or more characteristics of each data element is a subset of the set of characteristics. The graphical user interface further comprises a graphical representation of an initial trajectory displayed in the graphical object. The initial trajectory is formed by a mathematical spline function connecting a first point at first coordinates in the graphical object and representing a first characteristic, a second point at second coordinates in the graphical object and representing a second characteristic, and a predefined number of intermediate points between the first point and the second point, wherein each intermediate point represents an intermediate characteristic. The first point and the second point are control points in the mathematical spline function. The graphical user interface further comprises a first steering point displayed in or near the graphical object. The first steering point is a first control point in the mathematical spline function. The graphical user interface further comprises a second steering point displayed in or near the graphical object. The second steering point is a second control point in the mathematical spline function. A first user input is receivable for selecting one of the first point and the second point as a starting point and defining the other one of the first point and the second point as an end point. A second user input is receivable for moving at least one of the first steering point and the second steering point and resulting in the mathematical spline function calculating an updated trajectory and recalculating the coordinates of the intermediate points such that the intermediate points are located substantially on the updated trajectory. The graphical user interface enables the data elements to be selected by searching for data elements with meta-data that best match the first characteristic represented by the first point on the updated trajectory, the one or more intermediate characteristics represented by the one or more intermediate points on the updated trajectory and the second characteristic represented by the second point on the updated trajectory. The use of the graphical user interface results in the playlist wherein the data elements are ordered from a first data element corresponding to the starting point to a last data element corresponding to a end point.

Thus, a user friendly method and graphical user interface implementing the method are provided for creating a playlist for different types of data from a vast and growing amount of available data elements. For a type of data, the graphical object has different characteristics at different coordinates in the graphical object. The characteristics represented by the points on the trajectory are used to find data elements having characteristics that best match the characteristics at the points in the trajectory. Typically the graphical object contains textual or graphical labels indicated where in the graphical object specific characteristics are located. The trajectory thus gives an indication of what data elements can be expected in the playlist. Changing the trajectory resulting in different data elements to be included in the playlist is very user friendly. In essence only the steering points, possibly only one of the steering points, have to be moved using the graphical user interface.

The first user input for selecting the starting point can be a direct selection of the first or second point, e.g. by clicking on one of these points, or an indirect selection by selecting one of the steering points of the first or second point.

The moving of the steering points and the updated trajectory replacing the initial trajectory can be displayed in real time. The trajectory may be updated in the graphical user interface while moving the steering points.

It is possible that there are more than two steering points that are used by the spline function to shape the trajectory.

It is possible that for the purpose of play listing a spline function is produced on the visual map by clicking on the visual map in a series of steps. In this case the first click as a first user input will always corresponds to the starting point, the second click as a second user input will correspond to the end point of the playlist path; a third click as a third user input will correspond to the end point of the playlist and in this case the second click will become the first steering point. If there is a fourth click as a fourth user input then it will correspond to the end point of the playlist path and third point will become the second steering point, the second clicked point will become the first steering point. It may be programmed to restrict the number of clicks in this method. For example, three allowed clicks on a visual map shall result in a playlist path that has a start point (first click), an end point (third click) and a steering point (second click).

User inputs can be received via keyboard, mouse, touch screen and/or any other user input device such as vocal or gesture recognition.

The embodiment of claim 2 advantageously enables a predefined or stored trajectory to be used as initial trajectory. Predefined trajectories may be selectable by the end user. The predefined points may be chosen randomly to form the initial trajectory.

The embodiment of claim 3 advantageously enables the end-user to draw an initial trajectory or a part of the initial trajectory.

The embodiments of claims 4 and 13 advantageously enable the first and second points to be moved to change the starting point and end point of the trajectory and thus change the start and the end of the playlist.

The embodiments of claims 5 and 14 advantageously enable the graphical user interface to become even more user friendly. In these embodiments the end user can manipulate the first line and the second line by moving a single steering point. Moreover the end user can fine tune the trajectory by moving an intermediate steering point that is connected to one or more of the intermediate points. The steering mechanism for the intermediate steering point is similar to that of the other steering points, i.e. the line between the intermediate steering point and the corresponding intermediate point and the trajectory at the intermediate point is minimized.

The embodiments of claims 6 and 15 advantageously enable the location of the intermediate points to be restricted to within the area of the graphical object. This avoids the situation wherein intermediate points are located at coordinates unrelated to any characteristics and thus cannot be used to search in the meta-data and select data elements.

The embodiment of claim 7 advantageously enables a better visualization of the relationship between the first steering point and the first point and between the second steering point and the second points. This may avoid the situation wherein it is not entirely clear which steering point is related to which point. It is possible that the steering points and/or the first line and the second line are not displayed all the time, but are displayed e.g. only during user interaction with the graphical user interface.

The embodiment of claim 8 advantageously enables a better visualization of the steering points. It is possible that the steering points and/or the further line are/is not displayed all the time, but displayed e.g. only during user interaction with the graphical user interface.

The embodiment of claim 9 advantageously enables the graphical object to be either 2D or 3D. In case of 2D the points on the trajectory typically have an x and y coordinate. In case of 3D the points on the trajectory typically have an x, y and z coordinate. Moreover, the embodiment of claim 9 advantageously enables the trajectory to have a one-dimensional, two-dimensional or three-dimensional meaning in the 2D of 3D graphical object, resulting in a selection of songs based on one variable, two variables or three variables, respectively.

The embodiment of claim 10 advantageously enables the selection of the data elements in the playlist to be limited by the received restrictions. E.g. interactive objects or selection boxes can be part of the graphical user interface for receiving the fourth user input.

The embodiment of claim 11 advantageously enables location related data to be used to restrict the selection of data elements. The location related information is typically obtained from an external server or an application or module running on the device where the graphical user interface is used. A module for obtaining the current location may acquire the current location using a GPS signal, cell information from a mobile network or any other known technical means. It is possible that the end user provides a location by user input. Location related information may be geographical information or information related to a geographical location such as local weather conditions in the real time or foreseeable weather conditions that can be expected during the duration of the playlist. This invention may be utilized to restrict or adapt the selection of data elements with events in the real time. For example, a goal or a victory event in the soccer game.

According to an aspect of the invention a computer program product is proposed, which, when being executed by a processor, is adapted to carry out one or more of the above described method steps.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments shown in the drawings, in which.

DETAILED DESCRIPTION

A graphical user interface is used to create a playlist of data elements of any type. A graphical object is displayed representing a content based logical map arranged in two or three dimensions and defining characteristics at predefined coordinates. The characteristics are relevant to the selection of data elements for the playlist, as will be explained.

Examples of content based logical maps, which are typically related to a particular type of data elements, are logical maps with e.g. mood, arousal-valence or tempo-decade characteristics to explore media items such as music, photos or videos. Other examples of content based logical maps are logical maps for devotional content, educational content, sports content, games, cartoons, books and fashion items. It is to be understood that the invention is not limited to these logical maps and their related data elements.

The outer shape of the graphical object can be any 2D shape such as square, circle or rectangle, but preferably a circle. The outer shape can alternatively be any 3D shape.

Figure 1:
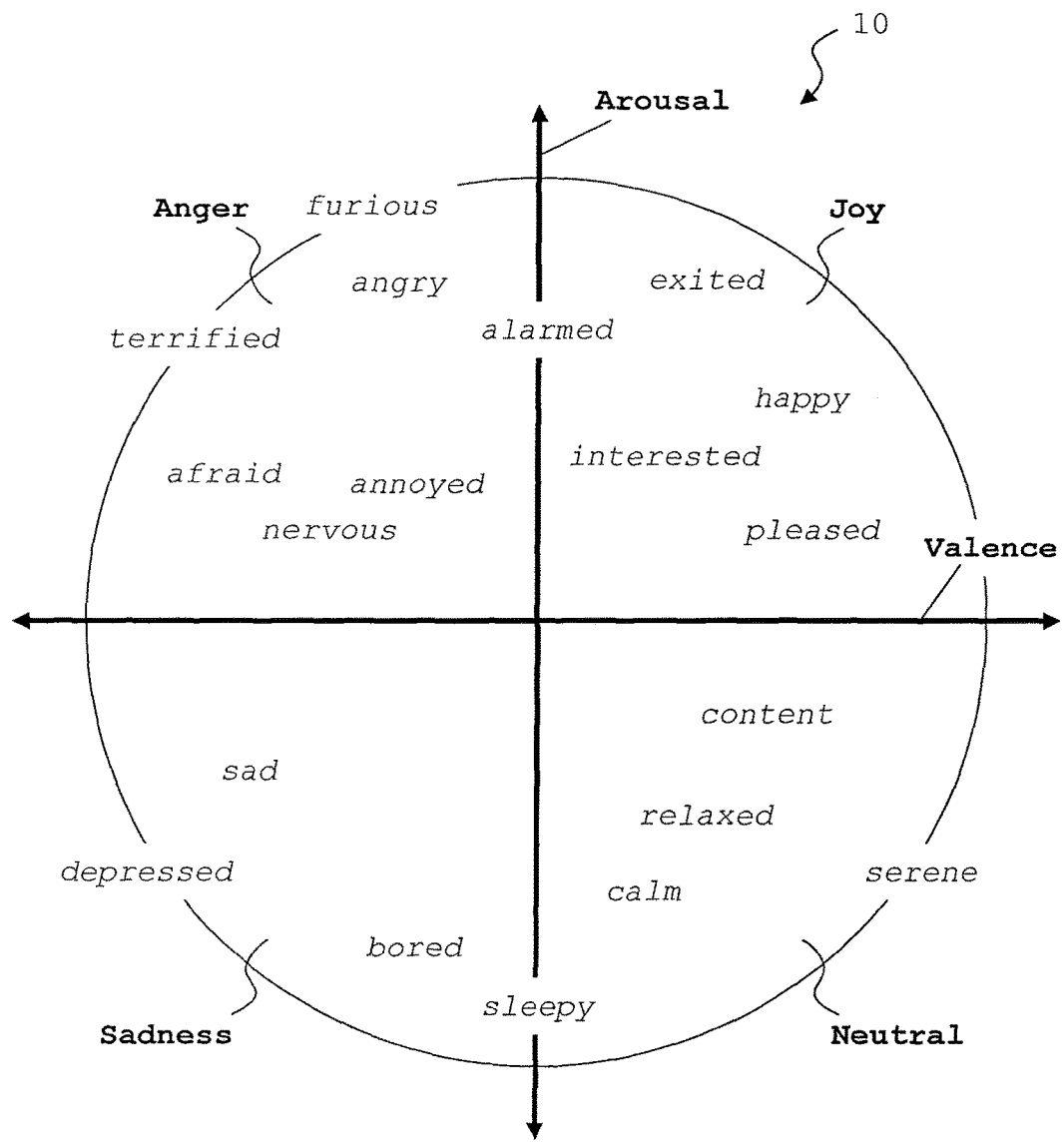
FIG. 1 shows a graphical object of an exemplary embodiment of the invention.

In the example of FIG. 1 a circular logical map is shown that may be used for the selection of music tracks based on mood characteristics. In FIG. 1 a model for classification of emotions is used, known as an emotional wheel 10. The emotion wheel is founded on psychology results and views of scientists like Plutchik in 1980, Russell in 1980, Thayer in 1989 and Russell and Feldman Barrett in 1999. The emotional wheel captures a wide range of significant variations in emotions in a two dimensional space. Emotions can be located in the two dimensional Cartesian system along the various intensities of emotions and degree of activation. The x-axis defines the level of valence. The y-axis defines the level of arousal. Each emotional state can be understood as a linear combination of these two dimensions. The four quadrants of the emotional wheel identify the primary emotions joy, anger, sadness and neutral. Secondary emotions, providing a more detailed classification, are indicated in italics and include the emotions pleased, happy, interested, exited, alarmed, annoyed, nervous, afraid, angry, furious, terrified, sad, depressed, bored, sleepy, calm, relaxed, content and serene. It is possible to define other and/or more primary and/or secondary emotions.

FIGS. 9-14 show other examples of logical maps that can be used for selecting data elements of various kinds.

Figure 9:
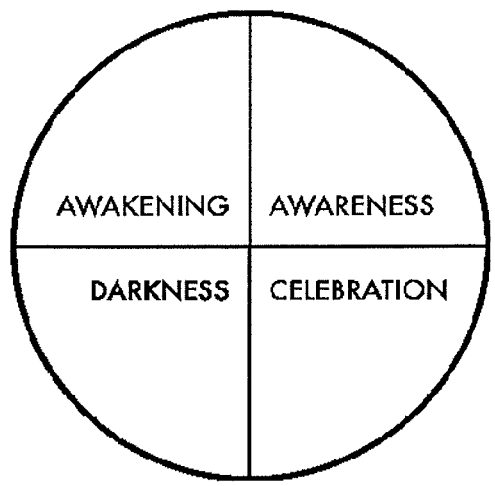
FIGS. 9-14 each shows a graphical object of other exemplary embodiments of the invention.

In FIG. 9 an example of an existence map is shown based on the four states of existence defined by Alek Vilo in the year 2005. Intensity increases from slow to fast when going from the center of the circle to the outer circle. The four quadrants define the states "awareness", "awakening", "darkness" and "celebration" (counter clockwise starting from top right).

Figure 10:
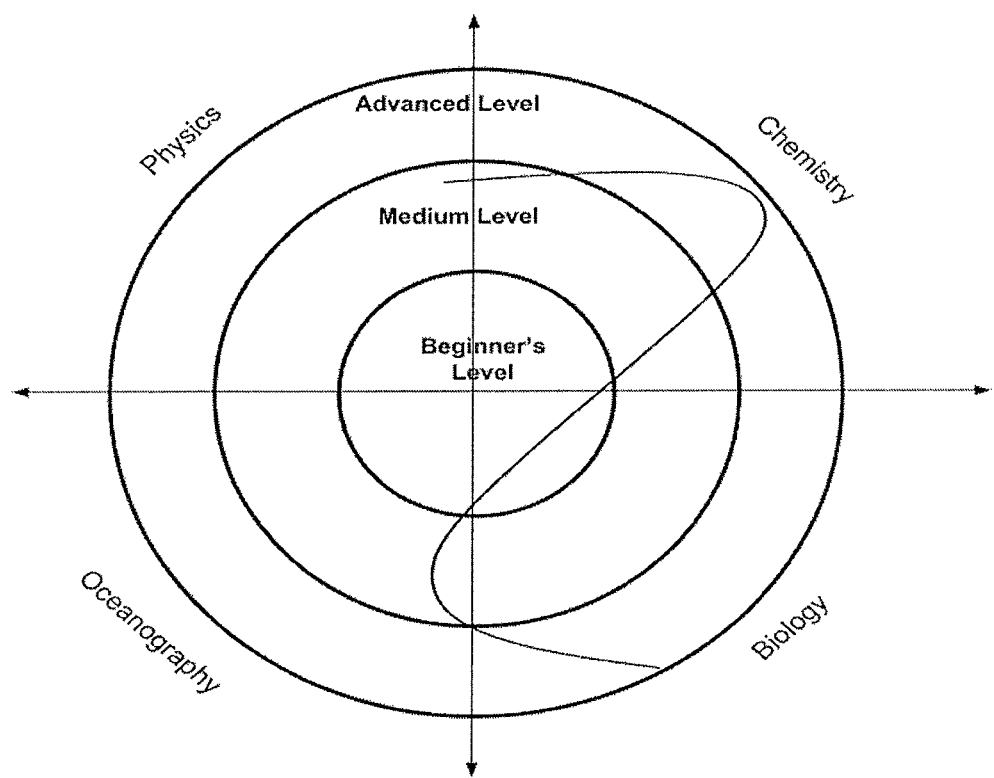

In FIG. 10 an example of a natural science map is shown. The four quadrants in this example define the fields of oceanography, physics, biology and chemistry (counter clockwise starting from top right). Each of the quadrants can be configured to be changeable into e.g. one of astronomy, material science and atmospheric science. The level of difficulty of the selectable data elements, such as teaching material, varies from beginner level to advanced level when going from the center of the circle to the outer circle.

Figure 11:
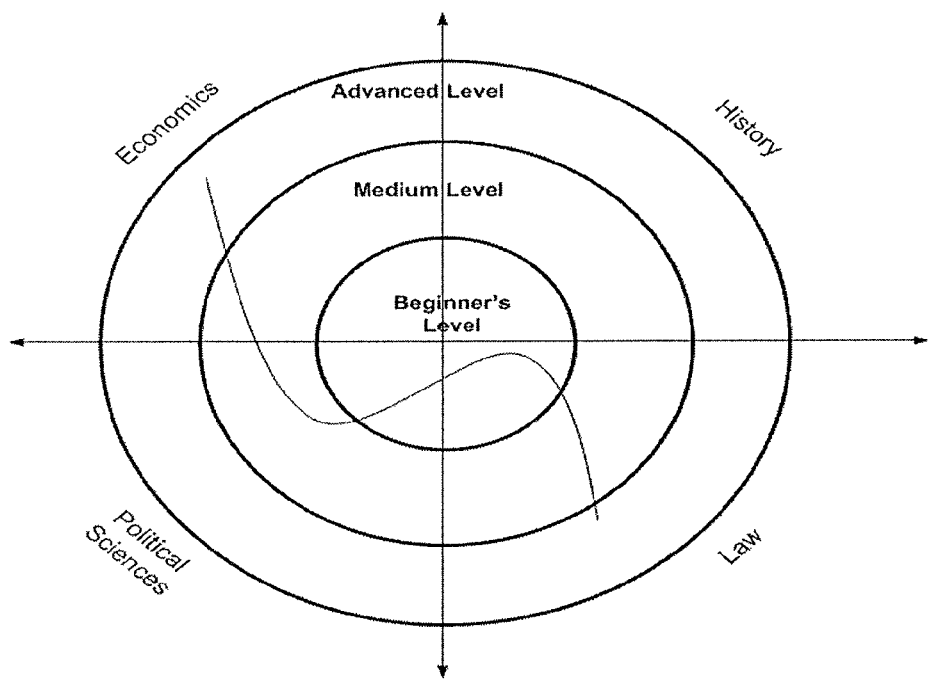

In FIG. 11 an example of a social science map is shown. The four quadrants in this example define the fields of history, economics, political sciences and law (counter clockwise starting from top right). Each of the quadrants can be configured to be changeable into e.g. one of anthropology, education, human geography, linguistics, psychology and sociology. The level of difficulty of the selectable data elements, such as teaching material, varies from beginner level to advanced level when going from the center of the circle to the outer circle.

Figure 12:
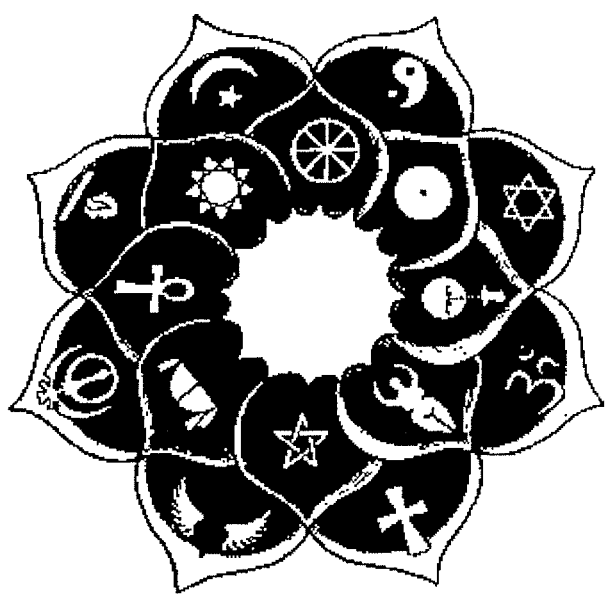

In FIG. 12 an example of a spiritual map is shown, wherein different sections correspond to different spiritual believes. Data elements selectable using this map are e.g. encyclopedic information about the spiritual believes or music items from the spiritual believes.

Figure 13:
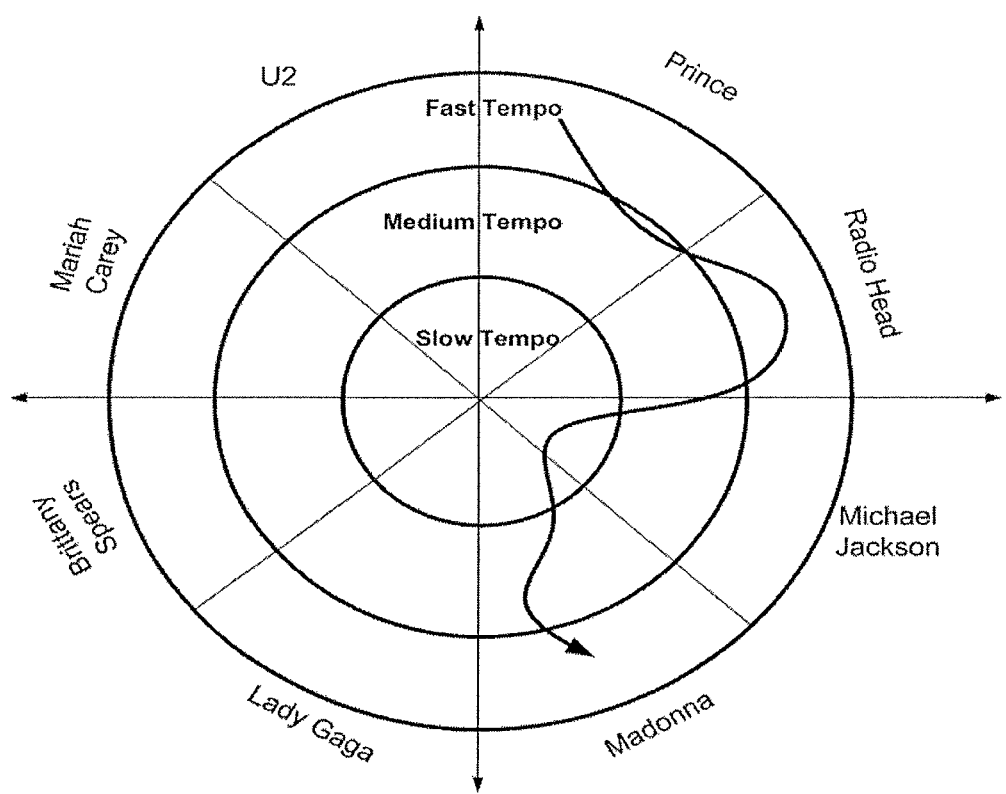

In FIG. 13 an example of an artist map is shown. The eight sections in this example define eight pop artists: Radio Head, Prince, Britney Spears, Madonna, Lady Gaga, Mariah Carey, Bob Marley and Michael Jackson. The selected artists as well as the number of artists can be different. The tempo of selectable music by the artists vary from slow tempo to fast tempo when going from the center of the circle to the outer circle. In FIG. 13 a trajectory is shown interconnecting points corresponding to potentially selected songs.

Tempo variation of the artist map of FIG. 13 can be replaced with e.g. the mood variation of the tracks that can vary from sad mood to cheerful mood to excited mood when going from the center of the circle to the outer circle.

Figure 14:
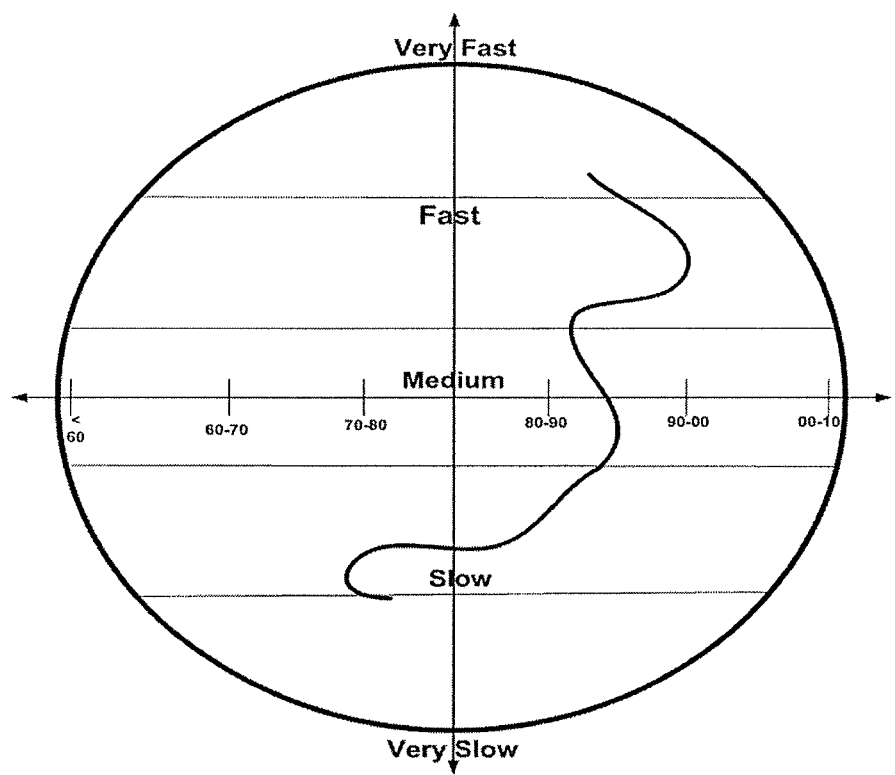

In FIG. 14 an example of a decade-versus-tempo map is shown. The y-axis defines the tempo from very slow at the bottom, via slow, medium and fast to very fast at the top. The x-axis defines decades in time from <1960 at the left, via 1960-1970, 1970-1980, 1980-1990 and 1990-2000 to 2000-2010 at the right. It will be understood that the axes can be scaled differently. In FIG. 14 a trajectory is shown along which songs can be selected that match the decade-tempo combination at points along the trajectory.

FIG. 1 and FIGS. 9-14 show that the logical map can have a one-dimensional meaning or a two-dimensional meaning. In the examples of FIG. 1, FIGS. 9-11 and FIGS. 13-14 the two axes represent different variables, resulting in a two-dimensional (i.e. based on two variables) selection of songs along a trajectory. In the example of FIG. 12 the logical map merely defines areas from which data elements can be chosen. In this example the two axes (not shown) have no meaning and the selection of data elements is one-dimensional (i.e. based on one variable). Although not shown, it is possible to use logical maps with a three-dimensional meaning. Such logical map typically shows a three-dimensional object wherein three axes represent three different variables, resulting in a three-dimensional (i.e. based on three variables) selections of media items along a trajectory.

The invention enables a user to draw a trajectory on the graphical object, such as the representation of the emotion wheel, as a basis for the generation of a playlist. In the example of the emotional wheel, a user will be given the option to specify an initial mood and a destination mood. The trajectory between the initial mood and the destination mood may be steered through the emotions falling in-between. Thus the obtained trajectory is then populated by music tracks to form a playlist.

Figure 2:
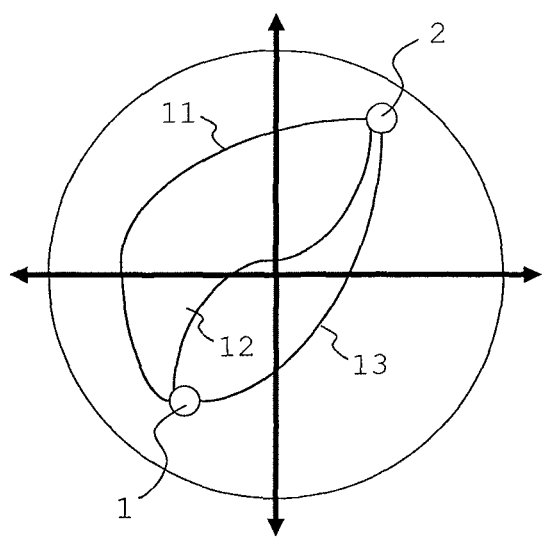
FIG. 2 shows elements of a graphical user interface of an exemplary embodiment of the invention.

FIG. 2 shows the emotional wheel as shown in FIG. 1. For readability purposes the labels indicating the axis, primary emotions and secondary emotions as shown in FIG. 1 are not shown in FIG. 2. A user may select the starting point 1 as starting point for a playlist. The starting point typically corresponds to a current emotion of the user. Furthermore the user may select the end point 2 as the end point for the playlist. A mathematical spline function connects the starting point 1 and the end point 2 to form the trajectory 11, 12 or 13 depending on the location of intermediate points.

A graphical user interface showing the emotional wheel may be presented, through which the user first affixes a starting point by using a mouse pointer to move the starting point and affixing it on the spot on the emotional wheel that resembles a perceived prevailing mood or emotion. The end-point resembling a desired future mood or emotion is then also affixed in a similar fashion by moving the second point. Next the trajectory is calculated between the two points and one or more intermediate points using the mathematical spline function. The trajectory may be altered to form a desired path through desired moods or emotions by moving the starting point 1 or end point 2 or by moving steering points for the starting point 1 and the end point 2, as will be explained.

It is to be understood that the user interface can be programmed to accept other mouse gestures to achieve a similar effect. Alternatively the user interface may use a touch screen interface, or any other man-machine interaction means.

Figure 3:
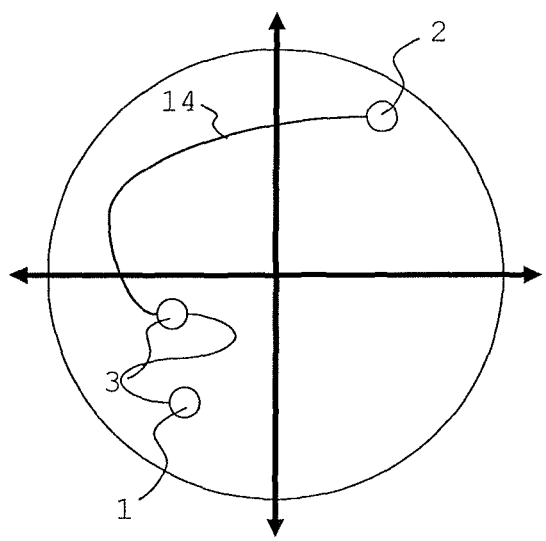
FIG. 3 shows elements of a graphical user interface of another exemplary embodiment of the invention.

As shown in FIG. 3, it is possible that a trajectory 14 between a starting point 1 and an end point 2 self intersects at one or more points 3, thus resulting in one or more recurring emotions along the trajectory.

It is possible to have the user interface display one or more predefined initial trajectories obtainable from a backend database. Examples of predefined trajectories related to moods are "from sad to happy" and "from excited to calm". The selected predefined mood trajectory will be displayed on the emotional wheel as initial trajectory and may be altered.

Figure 4:
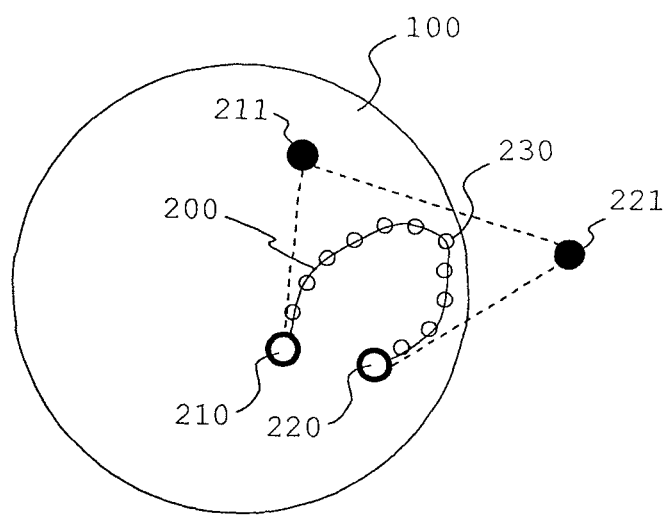
FIG. 4 shows elements of a graphical user interface of another exemplary embodiment of the invention.

FIG. 4 shows a graphical user interface of an exemplary embodiment of the invention, wherein a graphical object 100 is displayed. Typically the graphical object 100 includes text labels or images to visualize where in the graphical object 100 what characteristics are located, such as e.g. shown in FIG. 1. For readability purposes this is not shown in FIG. 4. It is to be understood that the circular shape of the graphical object 100 is merely an example and not limiting the invention, as described above.

The graphical user interface shows a trajectory 200 connecting a first point 210 with a second point 220 via intermediate points 230. The first time the trajectory is shown it is called the initial trajectory. The initial trajectory 200 is formed by a mathematical spline function connecting the first point 210 at first coordinates in the graphical object 100 and corresponding to a first characteristic, the second point 220 at second coordinates in the graphical object 100 and corresponding to a second characteristic, and the intermediate points 230 between the first point 210 and the second point 220, wherein each intermediate point 230 corresponds to an intermediate characteristic.

The start point could be any of the two points 210 and 220. The point that is selected by the user, e.g. by clicking on it, becomes the start point. The end point if not selected by the user then automatically becomes the end-point.

There are two steering points 211 and 221 tagged along the trajectory 200. These steering points 211,221 are used to maneuver the intermediate points 230. The first steering point 211 is displayed in the graphical object 100 and defines a first line between the first steering point 211 and the first point 210. The second steering point 221 is displayed near the graphical object 100 and defines a second line between the second steering point 221 and the second point 220.

It is possible to use a single steering point (not shown) preferably in the middle of the trajectory for both the first point 210 and the second point 220.

The end user can optionally fine tune the trajectory by moving an intermediate steering point that is connected to one or more of the intermediate points. The steering mechanism for the intermediate steering point is similar to that of the other steering points, i.e. the line between the intermediate steering point and the corresponding intermediate point and the trajectory at the intermediate point is minimized.

The line connecting the steering point to the respective start or end point can be displayed. This line also moves with the movement of steering point 211,221. A third line connecting the steering points 211,221 may be displayed as well.

In principle the first point 210 and the second point 220 of the trajectory 200 will never go outside the logical map. However the steering point(s) 211,221 may go outside the logical map. This allows for density variation along the trajectory 200, indicating more exploration on the denser points.

The two steering points 211,221 can be used to tweak the desired trajectory 200 which changes the trajectory per the user's wish-list offering him/her an instant gratification on the way of selection on the map-based content exploration. Hereto at least one of the first steering point 211 and the second steering point 221 is moved and the mathematical spline function is used to recalculate the coordinates of the intermediate points 230. The updated trajectory 200 is displayed, possibly in real time.

Figure 5:
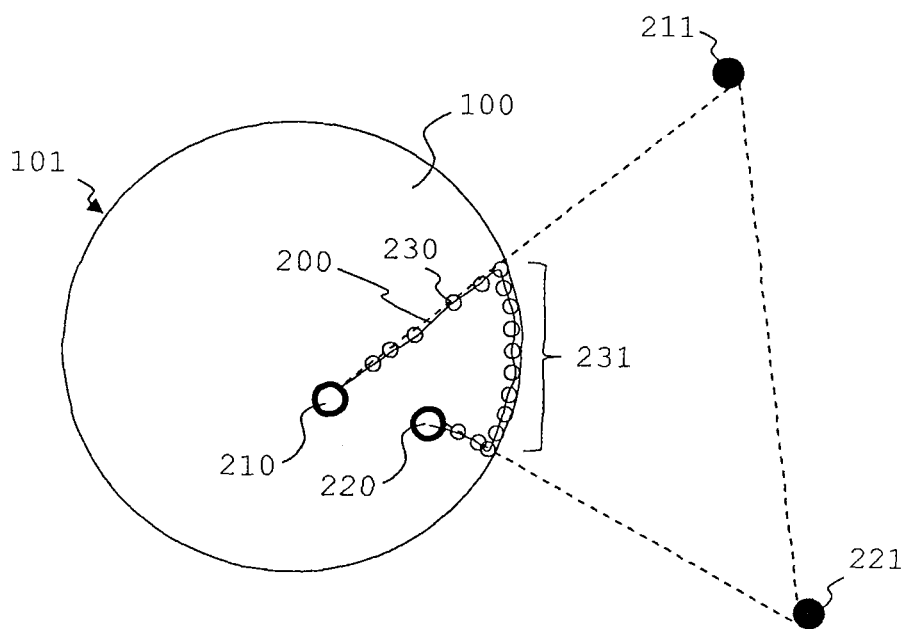
FIG. 5 shows elements of a graphical user interface of another exemplary embodiment of the invention.

With reference to FIG. 5, the graphical object 100 typically comprises an edge 101. The coordinates of the first point 210 and the coordinates of the second point 220 are typically restricted to coordinates within or on the edge 101. For each intermediate point beyond the edge 101, e.g. caused by the steering points 211,221 being located as shown in FIG. 5, coordinates of corrected intermediate points 231 are calculated on the edge 101 using a perpendicular projection of the intermediate point on the edge 101. In the trajectory 200 the intermediate points beyond the edge 101 are replaced with the corrected intermediate points 231.

With reference to FIG. 4 and FIG. 5, when the end user finishes maneuvering the trajectory, the two steering points 211,221 and the lines connecting them with the first and second points 210,220 may be hidden.

Once the trajectory is finished a backend engine, which is implemented as a software module or a set of software modules, uses a mathematical algorithm to populate the playlist with data elements along the trajectory. The backend engine may reside at a server, such as an online music portal server for music tracks, or be partially or entirely running on the client device where the user interface is active.

Data elements in the playlist may be pre-mapped streaming from a saved database and/or live streaming. Alternatively, hybrid content with hybrid quadrants may be used.

Figure 6:
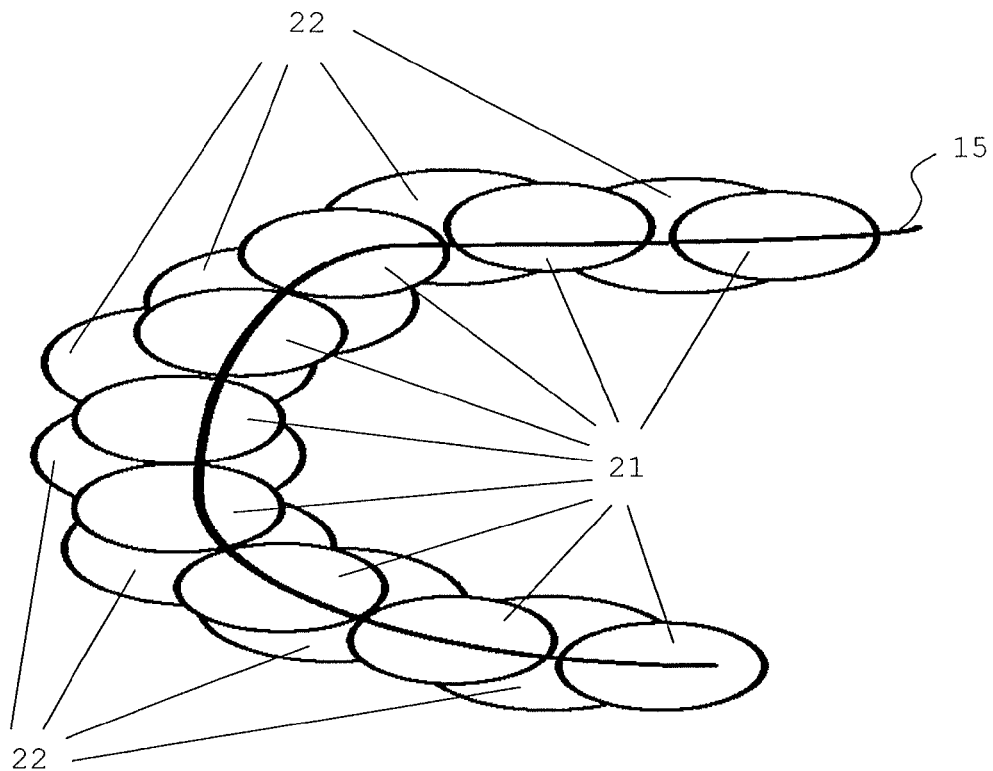
FIG. 6 shows a graphical representation of a mathematical algorithm for selecting data elements of an exemplary embodiment of the invention.

An example of a mathematical algorithm for selecting the data elements by searching in the meta-data for characteristics that best match the first characteristic at the first point 210 in the updated trajectory 200, the one or more intermediate characteristics at the one or more intermediate points 230 in the updated trajectory 200 and the second characteristic at the second point 220 in the updated trajectory 200 is shown in FIG. 6. The selected data elements are subsequently used to create the playlist wherein the data elements are ordered from starting point to end point.

Virtual circular sections are created along the trajectory as visualized in FIG. 6. The virtual circular sections are typically not shown in the graphical user interface. The circular sections are used to stretch the trajectory 15, which may be the trajectory 200 of FIG. 4 or FIG. 5, and define an area wherein the characteristics for the to be selected data elements are to be found. A first series of circular sections 21 are calculated having their centre points lying along the trajectory 15. A second series of circular section 22 are calculated having their center points at the points of intersection of the first series circular sections. Data elements with characteristics residing within the area of the first and second series of circular sections cover the data tracks being selectable for insertion in the playlist.

Instead of calculating circular sections as shown in FIG. 6, the area around the trajectory 15 may be calculated by a probabilistic distribution function virtually forming a regular or irregular shaped area following the trajectory 15.

Another example of a mathematical algorithm uses a distance function to virtually create one or more additional trajectories following the shape of the trajectory 15 may be calculated at a predefined distances to a trajectory 15. The mathematical algorithm is then applied to the trajectory and the one or more additional trajectories. The thus obtained areas along the different trajectories together form a larger area. Data elements with characteristics residing within the larger area cover the data elements being selectable for insertion in the playlist.

On a mood map as depicted in FIG. 1, data elements can e.g. be selected as follows. The X-axis and Y-axis may be scaled between (−1,1). The user affixed and by the spline function generated trajectory on the 2D mood map is used to calculate points on or near the trajectory. The calculation of these points may be performed in the front-end application at the end-user or alternatively at a backend system where the backend engine resides. In case the front-end application calculates the points, the front-end send the coordinates of the points (i.e. of the start point, end point and the intermediate points) to the backend system. The searching algorithm at the backend system looks up the songs that have pre-mapped mood characteristics corresponding to the x and y coordinates of the trajectory points as received from the front-end application or calculated in the backend system and returns those songs for the purpose of playlisting. It will be understood that the number of intermediate points and the grid resolution defining the number of possible points on or near the trajectory may vary.

The processing logic for selecting data element can vary based on the type of the logical map. For maps other than the mood map as depicted in FIG. 1, the processing logic typically looks up characteristics other than mood characteristics. E.g. in the exemplary artist map as depicted in FIG. 13 the playlisting is based on tempo of the tracks and the artists.

The playlist may be refined in various ways. Refinements may have a real-time impact on the playlist.

Through the user interface a user may be given an option to restrict the selectable data elements, such as music tracks using available meta-data. The meta-data is e.g. used to select music tracks from a single genre or a combination of two or more genres, an artist, overlapping of two or more artists, a year of release or a time frame for release years, or any other meta-data or combinations of meta-data.

The user interface may be used to display the total time-length of the data elements, such as music tracks, and/or the total number of data elements, such as music tracks, sequenced to be played in the playlist. An option may be displayed to make the playlist shorter using input parameters such as the total number of songs and/or the total time-length of the playlist.

The user interface may display an option to partially play or display the data elements or a selection of the data elements in the playlist. An option is e.g. displayed to show e.g. 30%, 50% or 100% of the total time-length of each date element. This way the total playlist can be played with short-play. Additionally there may be an automatic suggestive option to affect only selective data elements in the playlist. Through this option e.g. the most liked music tracks will be played for a longer duration while music tracks with a predefined low rating will be short-played.

Location related data may be used to restrict the selection of data elements. The location related information is typically obtained from an external server or from an application or module running on the device where the graphical user interface is used. A module for obtaining a current location may acquire the current location using a GPS signal, cell information from a mobile network or any other known technical means. It is possible that the end user provides a location by user input. Location related information may be geographical information or information related to a geographical location such as local weather conditions. The location related data may e.g. be used to adapt the playlist length to the expected duration of a journey or adapt the data elements in the playlist to current and/or predictable weather conditions that are valid or may alter subsequently in steps of every song playing during the duration of the playlist.

Figure 7:
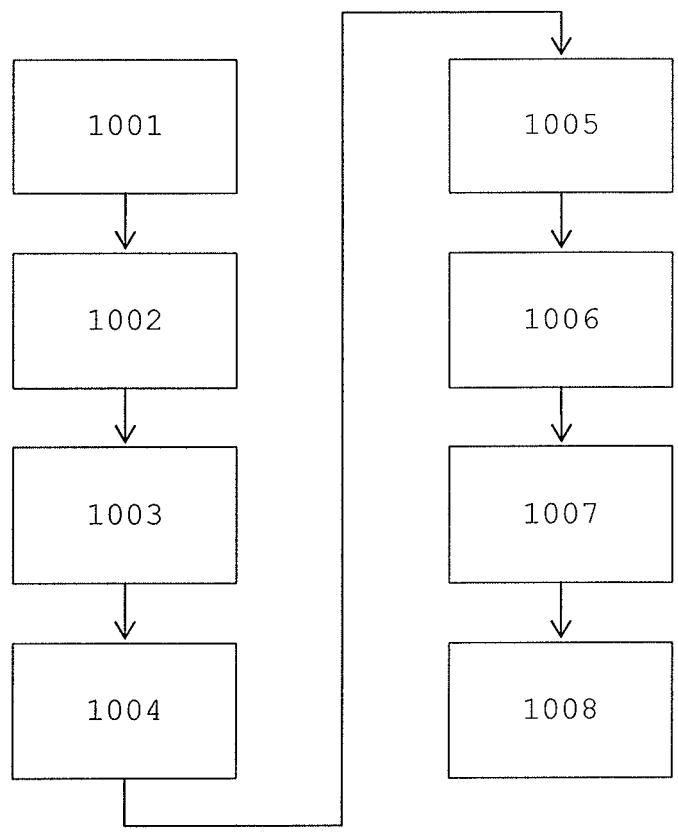
FIG. 7 shows steps of a method for creating a playlist according to an exemplary embodiment of the invention.

In FIG. 7 steps of a method are shown for creating a playlist according to an exemplary embodiment of the invention. In step 1001 the graphical object 100 is displayed wherein predefined characteristics are located at predefined coordinates. In step 1002 the graphical representation of the initial trajectory 200 is displayed in the graphical object 100. In step 1003 the first steering point 211 is displayed in or near the graphical object 100. In step 1004 the second steering point 221 is displayed in or near the graphical object 100. In step 1005 first user input is received for selecting one of the first point 210 and the second point 220 as the starting point of the trajectory and defining the other one of the first point 210 and the second point 220 as the end point. In step 1006 second user input is received moving at least one of the first steering point 211 and the second steering point 221 and resulting in using the mathematical spline function to recalculate the coordinates of the intermediate points 230 and resulting in an updated trajectory 200. In step 1007 the data elements are selected. In step 1008 the playlist is created from the selected data elements, wherein the data elements are ordered from starting point to end point.

It is to be understood that the order of the method steps is not fixed to the order shown in FIG. 7.

In the examples above, two steering points are shown that are associated with the starting point 1 and the end point 2 on the trajectory, respectively. The invention is not limited to the use of these two steering points. It is e.g. possible to have more than two steering points that can be associated with intermediate points on the trajectory or have no associated point on the trajectory and merely shape the trajectory using the spline function.

The mathematical spline function connects the first point 210 to the second point 220 to form the trajectory 200, which shape is determined by the position of the steering points 211, 221. The trajectory 200 is the spline that is defined by the spline function and the first point 210, the second point 220 and the steering points 211,221, wherein the first point 210 and the second point 220 are points on the spline and the steering points 211,221 are points that are to be approached as close as possible by the spline.

In their most general form, splines can be considered a mathematical model that associate a continuous representation of a curve or surface with a discrete set of points in a given space. Spline fitting is a form of piecewise approximation using various forms of polynomials of degree n, or more general functions, on an interval in which they are fitted to the function at specified points, known as control points, nodes, knots or knot points. The first point 210, second point 220 and steering points 211,221 are such knot points. The polynomial used can change, but the derivatives of the polynomials are required to match up to degree n−1 at each side of the knots, or to meet related interpolatory conditions. Boundary conditions are also imposed on the end points of the intervals, i.e. the first point 210 and the second point 220, namely that these points are to be on the spline.

Examples of mathematical spline functions are B-splines, Bézier splines, non-uniform rational basis splines (also known as Nurbs) and Ferguson splines. To illustrate how the mathematical spline function is used in the generation of the trajectory 200 the Nurbs function will be explained in more detail. The invention is not limited to the use of Nurbs functions, any other mathematical spline function may be used.

A Nurbs curve is defined by its order, a set of (possibly weighted) control points and a knot vector. Nurbs curves and surfaces are generalizations of both B-splines and Bézier curves and surfaces, the primary difference being the possibility of weighting of the control points which makes Nurbs curves rational (non-rational B-splines are a special case of rational B-splines).

By evaluating a Bézier or a Nurbs curve at various values of the parameter, the curve can be represented in Cartesian two- or three-dimensional space. Likewise, by evaluating a Nurbs surface at various values of the two parameters, the surface can be represented in Cartesian space.

Nurbs curves and surfaces are useful for a number of reasons: they are invariant under affine as well as perspective transformations (operations like rotations and translations can be applied to Nurbs curves and surfaces by applying them to their control points); they offer one common mathematical form for both standard analytical shapes (e.g. conics) and free-form shapes; they provide the flexibility to design a large variety of shapes; they reduce the memory consumption when storing shapes (compared to simpler methods); they can be evaluated reasonably quickly by numerically stable and accurate algorithms.

The control points determine the shape of the curve. Typically, each point of the curve is computed by taking a weighted sum of a number of control points. The weight of each point varies according to the governing parameter. For a curve of degree d, the weight of any control point is only nonzero in d+1 intervals of the parameter space. Within those intervals, the weight changes according to a polynomial function (basis functions) of degree d. At the boundaries of the intervals, the basis functions go smoothly to zero, the smoothness being determined by the degree of the polynomial.

Nurbs can be calculated for non-uniform knot vectors that have uneven spacing between knot points and/or multiple internal knot values with fixed end points. This makes the Nurbs function highly suitable for defining the trajectory 200.

Nurbs curves are not only controlled by control points, such as the steering points 211,221, but they can also be controlled by weights (at each knot point if required).

A Nurbs curve is a vector-valued piecewise rational polynomial function of the form:

$$C(u) = \frac{\sum_{i=0}^{n} w_i P_i N_{i,k(u)}}{\sum_{i=0}^{n} w_i N_{i,k(u)}}$$

where $w_i$ are the weights, $P_i$ are the knot points and $N_{i,k}$ are the normalized basis-spline basis function of degree k. The basis splines are defined recursively as:

$$N_{i,k(u)} = \frac{u - t_i}{t_{i+k} - t_i} N_{i,k-1(u)} + \frac{t_{i+k+1} - u}{t_{i+k+1} - t_{i+1}} N_{i+1,k-1(u)}$$

and $$N_{i,0(u)} = \begin{cases} 1, & \text{if } t_i \leq u < t_{i+1} \\ 0 & \text{else} \end{cases}$$

where $t_i$ are the knots:

$$U = \{t_0, t_1, t_2, \ldots, t_m\}$$

The knot vector uniquely determines the basis-splines as is clear from the above equations. The relation between the number of knots (m+1), the degree (k) of $N_{i,k}$ and the number of control points (n+1) is given by m=n+k+1. The sequence of knots in the knot vector U, is assumed to be non-decreasing, such that. $t_i <= t_i+1$, so each successive pair of knots represents an interval $[t_i, t_{i+1})$ for the parameter values to calculate a segment of a shape. The relative parametric intervals (or knot intervals) for Nurbs need not be the same for every shape segment, so that the knot spacing can be non-uniform, leading to a non-periodic knot vector of the form:

$$U = \{a, \ldots, a, t_{k+1}, \ldots, t_{m-k-1}, b, \ldots b\}$$

where a and b can be repeated knot values with a multiplicity equal to k+1. The multiplicity of a knot affects the parametric continuity at this knot. Nonperiodic basis-splines, like Nurbs, are infinitely continuously differentiable in the interior of a knot span and k−m−1 times continuously differentiable at a knot, where M is the multiplicity of the knot. This is in contrast to a periodic knot vector $U = \{0, 1, \ldots, n\}$, which is everywhere k−1 times continuously differentiable. Considering the knot vector for Nurbs, the end knot points $(t_k, t_{n+1})$ with multiplicity k+1 coincide with the end control points $P_0, P_n$.

Given that knot spacing can be non-uniform, the basis-splines are therefore no longer the same for each interval $[t_i, t_{i+1})$ and the degree of the basis-spline can also vary. Over the whole range of parameter values represented by the knot vector, the different basis-splines build up continuous (overlapping) blending functions $N_{i,k(u)}$, as previously defined, over this range. These blending functions have the following properties:

$N_{i,k(u)} >= 0$, for all i, k, u;

$N_{i,k(u)} = 0$, if u not in $[t_i, t_{i+k+1})$, meaning local support of k+1 knot spans, where $N_{i,k(u)}$ is nonzero;

if u in $[t_i, t_{i+1})$, the non-vanishing blending functions are:

$$N_{i-k,k(u)}, \ldots, N_{i,k(u)}$$

$$\sum_{j=i-k}^{i} N_{j,k(u)} = \sum_{i=0}^{n} N_{i,k(u)} = 1$$

in case of multiple knots, 0/0 is deemed to be zero.

Taken together, the result into the convex hull, the control points build up for a shape show that k+1 successive control points a shape segment is defined and a control point is involved in k+1 neighboring shape segments. Therefore, a change to a control point or weight influences only k+1 shape segments, defined over the given interval.

The previous definition of a Nurbs-curve can be rewritten using rational basis functions:

$$R_{i,k(u)} = \frac{w_i N_{i,k(u)}}{\sum_{j=0}^{n} w_j N_{j,k(u)}}$$

Figure 8:
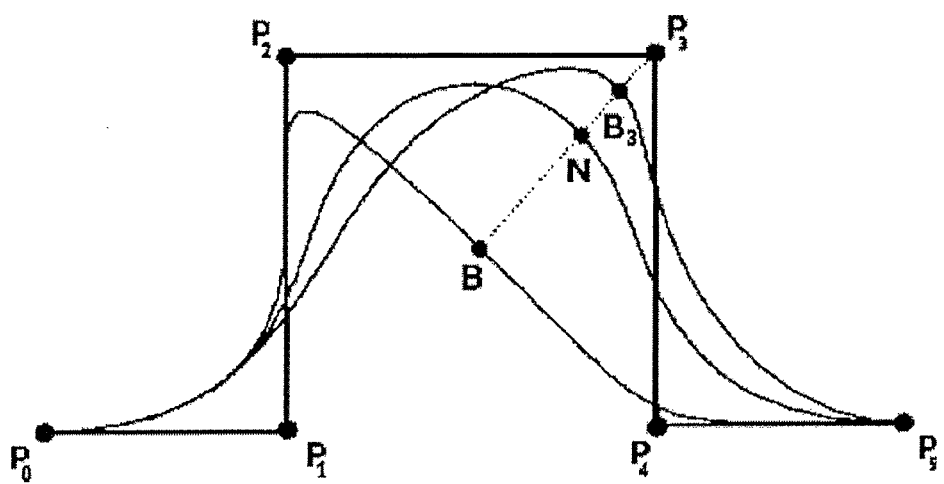
FIG. 8 shows a Nurbs curve with weighted control points.

-continued $$C(u) = \sum_{i=0}^{n} P_i R_{i,k(u)}$$

into:

When using weights to construct a curve, the weight $w_i$ of a knot point $P_i$ affects only the range $[t_i, t_{i+k+1})$, as can be seen in the Nurbs example of FIG. 8. In the example of FIG. 8 the following points are defined:

$B=C(u;w_i=0)$ $N=C(u;w_i=1)$ $B_i=C(u;w_i\neq\{0,1\})$

N and $B_i$ can also be expressed as:

$N=(1-a)B+aP_i$ $B_i=(1-b)B+bP_i$ where $a=R_i,k(u;w_i=1)$ $b=R_i,k(u)$

The following identity is obtained from the expression of a and b:

$(1-a)/a:(1-b)/b=P_iN/BN:P_iB_i/BB_i=w_i$ which is called the cross- or double ratio of the four points $P_i$, B, N, $B_i$.

From these expressions, the effect of shape modification can be easily seen as follows: $B_i$ sweeps out on a straight line segment, if $w_i=0$, then $P_i$ has no effect on shape; if $w_i$ increases, so b and the curve is pulled toward $P_i$ and pushed away from $P_j$, for $j\neq i$; if $w_i$ decreases, so b and the curve are pushed away from $P_i$ and pulled toward $P_j$, for $j\neq i$; if $w_i\to\infty$ then $b\to 1$ and $B_i\to P_i$, if u in $[t_i,t_{i+k+1})$. The geometric impact and meaning of using weights can be clearly seen in FIG. 8.

The mathematical spline function thus defining the trajectory 200 is used to calculate the coordinates of the intermediate points 230 and for drawing the trajectory 200 in the graphical user interface.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory or flash memory) on which alterable information is stored. Moreover, the invention is not limited to the embodiments described above, which may be varied within the scope of the accompanying claims.

The invention claimed is:

1. A computer implemented method for creating a playlist comprising a plurality of data elements, wherein each data element is associated with meta-data representing at least one characteristic of the data element, said method comprising the steps of:
    displaying a graphical object wherein points representing predefined characteristics are located at predefined coordinates in a Cartesian coordinate system, each of said predefined characteristics being unique, said predefined characteristics forming a set of characteristics, and the one or more characteristics of each data element being a subset of said set of characteristics;
    displaying a graphical representation of an initial trajectory in said graphical object, wherein said initial trajectory is formed by a mathematical spline function connecting a first point at first coordinates in said graphical object and representing a first characteristic, a second point at second coordinates in said graphical object and representing a second characteristic, and a predefined number of intermediate point at intermediate coordinates between said first point and said second point, wherein each of said intermediate point represents at least one intermediate characteristic, said first point and said second point being control points in said mathematical spline function;
    displaying a first steering point in or near said graphical object, said first steering point being a first control point in said mathematical spline function;
    displaying a second steering point in or near said graphical object, said second steering point being a second control point in said mathematical spline function;
    receiving a first user input selecting one of said first point and said second point as a starting point and defining another one of said first point and said second point as an end point;
    receiving a second user input moving at least one of said first steering point and said second steering point and using said mathematical spline function to calculate an updated trajectory and to recalculate said intermediate coordinates of said intermediate point such that said intermediate point is located substantially on said updated trajectory;
    selecting the data elements by searching for data elements with meta-data that best match said first characteristic represented by said first point on said updated trajectory, said intermediate characteristic represented by said intermediate point on said updated trajectory and said second characteristic represented by said second point on said updated trajectory; and
    creating a playlist wherein said data elements are ordered from a first data element corresponding to said starting point to a last data element corresponding to said end point;
    wherein at least one of said data elements of said intermediate characteristic represented by said intermediate point on said updated trajectory is different than at least one of data elements of said intermediate characteristic represented by said intermediate point of said initial trajectory.

2. The method according to claim 1, wherein at least one of said first point, said second point, said intermediate point, and one or more of the said steering points are predefined to form said initial trajectory without a user interaction.

3. The method according to claim 1, further comprising the step of receiving an initial user input for defining at least one of said first coordinates of said first point, said second coordinates of said second point, said intermediate coordinates of said intermediate point, said first steering point, and said second steering point to form said initial trajectory.

4. The method according to claim 1, further comprising the step of receiving a third user input moving at least one of said first point and said second point, and using said mathematical spline function to calculate a further updated trajectory and to recalculate said intermediate coordinates of said intermediate point such that said intermediate point is located substantially on said further updated trajectory.

5. The method according to claim 4, further comprising the step of receiving a fourth user input indicating at least one element selected from the group consisting of a subset of the meta-data, a maximum number of data elements in the playlist, and a maximum time-length of the playlist, said fourth user input restricting said selecting of said data elements by further searching for data elements that best match said fourth user input.

6. The method according to claim 1, wherein said first steering point and said second steering point are one and the same.

7. The method according to claim 1, wherein said initial trajectory is modifiable by an intermediate steering point of said intermediate point.

8. The method according to claim 1, wherein said graphical object comprises an edge, and wherein said method further comprising the steps of:
limiting said first coordinates and said second coordinates to coordinates within or on said edge; and for each intermediate point beyond the edge, calculating coordinates of a corrected intermediate point on said edge using a perpendicular projection of said intermediate point on said edge; and
replacing in said initial trajectory said intermediate point beyond said edge with said corrected intermediate point.

9. The method according to claim 8, wherein said calculating said coordinates of said corrected intermediate point on said edge using said perpendicular projection is resultant from at least one of said first steering point or said steering point being moved to a location beyond said edge of said graphical object.

10. The method according to claim 1, further comprising the step of displaying a first line between said first point and said first steering point, and a second line between said second point and said second steering point.

11. The method according to claim 10, further comprising the step of displaying a further line connecting said first steering point with said second steering point.

12. The method according to claim 1, wherein said graphical object is selected from the group consisting of a two-dimensional graphical object, and a three-dimensional graphical object, and wherein said initial trajectory has one of a one-dimensional meaning, a two-dimensional meaning, and a three-dimensional meaning.

13. The method according to claim 1, further comprising the steps of:
obtaining related data selected from the group consisting of location related data, real-time related data, and foreseeable event related data, and
restricting said selecting of said data elements based on said related data.

14. A graphical user interface system for creating a playlist comprising a plurality of data elements wherein each data element is associated with meta-data representing at least one characteristic of the data element, said graphical user interface system comprising:
a computer system having at least one processor, at least one computer-readable storage media in communication with said processor, at least one display in communication with said processor, and at least one user input in communication with said processor; and
a graphical user interface comprising:
a graphical object wherein points representing at least one predefined characteristic are located at predefined coordinates in a Cartesian coordinate system, each predefined characteristic being unique, said predefined characteristic forming a set of characteristics, and the characteristic of each data element being a subset of said set of characteristics;
a graphical representation of an initial trajectory displayed in said graphical object, wherein said initial trajectory is formed by a mathematical spline function connecting a first point at first coordinates in said graphical object and representing a first characteristic, a second point at second coordinates in said graphical object and representing a second characteristic, and a predefined number of intermediate point at intermediate coordinates between said first point and said second point, wherein each of said intermediate point represents an intermediate characteristic, said first point and said second point being control points in said mathematical spline function;
a first steering point displayed in or near said graphical object, said first steering point being a first control point in said mathematical spline function; and
a second steering point displayed in or near said graphical object, said second steering point being a second control point in said mathematical spline function, and wherein:
a first user input is receivable from said user input for selecting a starting point from the group consisting of said first point, and said second point, and defining another one of said first point and said second point as an end point; and
a second user input is receivable from said user input for moving at least one of said first steering point and said second steering point resulting in said mathematical spline function calculating an updated trajectory and recalculating said intermediate coordinates of said intermediate point such that said intermediate point is located substantially on said updated trajectory, for enabling the data elements being selected by searching for data elements with meta-data that best match said first characteristic represented by said first point on said updated trajectory, said intermediate characteristic represented by said intermediate point on said updated trajectory, and said second characteristic represented by said second point on said updated trajectory, and resulting in the playlist wherein the data elements are ordered from a first data element corresponding to said starting point to a last data element corresponding to said end point;
wherein at least one of said data elements of said intermediate characteristic represented by said intermediate point on said updated trajectory is different than at least one of data elements of said intermediate characteristic represented by said intermediate point of said initial trajectory.

15. The graphical user interface system according to claim 14, wherein said graphical user interface further comprising a third user input receivable from said user input for moving at least one of said first point and said second point, and resulting in said mathematical spline function calculating a further updated trajectory and recalculating said intermediate coordinates of said intermediate point such that said intermediate point is located substantially on said further updated trajectory.

16. The graphical user interface according to claim 14, wherein said first steering point and said second steering point are one and the same.

17. The graphical user interface according to claim 14, wherein said initial trajectory is modifiable by an intermediate steering point of at least one of said intermediate point.

18. The graphical user interface according to claim 14, wherein said graphical object comprises an edge, wherein said first coordinates and said second coordinates are limited to coordinates within or on said edge, wherein for each of said intermediate point beyond said edge coordinates of a corrected intermediate point on said edge are calculated using a perpendicular projection of said intermediate point on said edge, and wherein in said initial trajectory said intermediate point beyond said edge are replaced with said corrected intermediate point.

19. The method according to claim 18, wherein said calculating said coordinates of said corrected intermediate point on said edge using said perpendicular projection is resultant from at least one of said first steering point or said steering point being moved to a location beyond said edge of said graphical object.

20. A non-transitory computer readable storage medium, wherein a computer program product is stored thereon comprising a plurality of instructions for execution by a processor, which when executed, causes the processor to perform the steps of:
displaying a graphical object wherein points representing predefined characteristics are located at predefined coordinates in a Cartesian coordinate system, each of said predefined characteristics being unique, said predefined characteristics forming a set of characteristics, and the one or more characteristics of each data element being a subset of said set of characteristics;
displaying a graphical representation of an initial trajectory in said graphical object, wherein said initial trajectory is formed by a mathematical spline function connecting a first point at first coordinates in said graphical object and representing a first characteristic, a second point at second coordinates in said graphical object and representing a second characteristic, and a predefined number of intermediate point at intermediate coordinates between said first point and said second point, wherein each of said intermediate point represents at least one intermediate characteristic, said first point and said second point being control points in said mathematical spline function;
displaying a first steering point in or near said graphical object, said first steering point being a first control point in said mathematical spline function;
displaying a second steering point in or near said graphical object, said second steering point being a second control point in said mathematical spline function;
receiving a first user input selecting one of said first point and said second point as a starting point and defining another one of said first point and said second point as an end point;
receiving a second user input moving at least one of said first steering point and said second steering point and using said mathematical spline function to calculate an updated trajectory and to recalculate said intermediate coordinates of said intermediate point such that said intermediate point is located substantially on said updated trajectory;
selecting the data elements by searching for data elements with meta-data that best match said first characteristic represented by said first point on said updated trajectory, said intermediate characteristic represented by said intermediate point on said updated trajectory and said second characteristic represented by said second point on said updated trajectory; and
creating a playlist wherein said data elements are ordered from a first data element corresponding to said starting point to a last data element corresponding to said end point;
wherein at least one of said data elements of said intermediate characteristic represented by said intermediate point on said updated trajectory is different than at least one of data elements of said intermediate characteristic represented by said intermediate point of said initial trajectory.

21. The method according to claim 20, further comprising the step of receiving a third user input moving at least one of said first point and said second point, and using said mathematical spline function to calculate a further updated trajectory and to recalculate said intermediate coordinates of said intermediate point such that said intermediate point is located substantially on said further updated trajectory.

22. The method according to claim 20, wherein said graphical object comprises an edge, and wherein said method further comprising the steps of:
limiting said first coordinates and said second coordinates to coordinates within or on said edge; and for each intermediate point beyond the edge, calculating coordinates of a corrected intermediate point on said edge using a perpendicular projection of said intermediate point on said edge; and
replacing in said initial trajectory said intermediate point beyond said edge with said corrected intermediate point.

23. The method according to claim 22, wherein said calculating said coordinates of said corrected intermediate point on said edge using said perpendicular projection is resultant from at least one of said first steering point or said steering point being moved to a location beyond said edge of said graphical object.

* * * * *